June 21, 1960   B. G. HOWLEY ET AL   2,941,297
TILTING LEVEL
Filed June 8, 1956   3 Sheets-Sheet 2
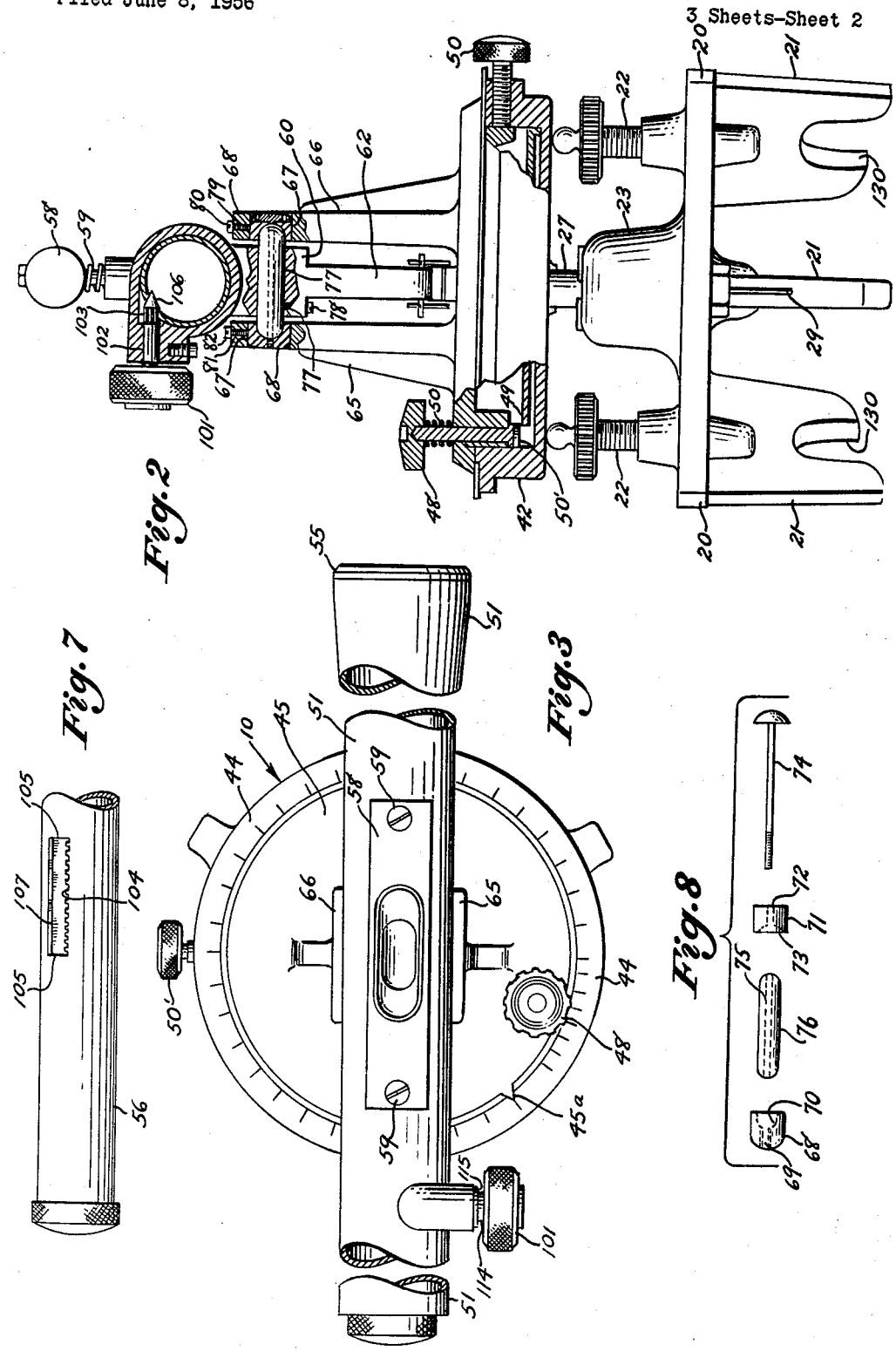

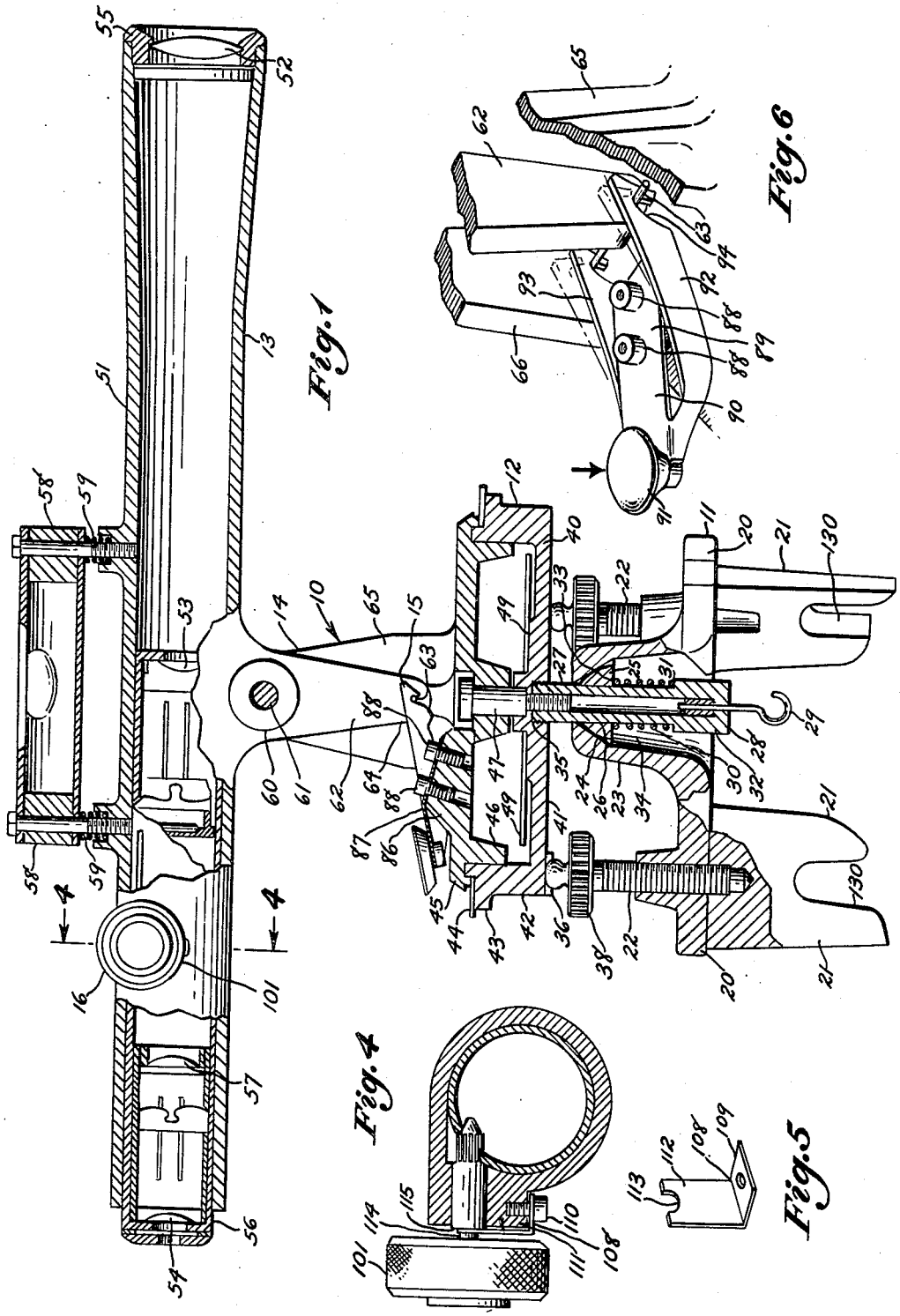

June 21, 1960

B. G. HOWLEY ET AL 2,941,297

TILTING LEVEL

Filed June 8, 1956

United States Patent Office 2,941,297
Patented June 21, 1960

2,941,297
TILTING LEVEL

Bernard G. Howley, Dorchester, and Adolph W. Holmberg, Quincy, Mass., assignors to O. L. Berger & Sons, Inc., Boston, Mass., a corporation of Massachusetts Filed June 8, 1956, Ser. No. 590,234

2 Claims. (Cl. 33—73)

This invention relates generally to the field of surveying instruments, and more particularly to an improved tilting level provided with an alignment telescope which plunges for plumbing, aligning walls, studs and other vertical objects, of a type having utility for farmers, masons, landscape gardeners and others, whose requirements are less exacting than those of surveyors and engineers.

Instruments of this type are normally provided with a means whereby the telescope tube may be locked in horizontal position with respect to supporting components of the device for use as a level in conjunction with a leveling rod, and also includes means commonly called the horizontal circle for laying off angles. While devices of this type are normally mounted upon a tripod or other portable supports, it is occasionally desirable to be able to use such instruments supported on tables, rock ledges and similar natural supports.

It is among the principal objects of the present invention to provide improved telescope locking construction whereby the telescope tube may be quickly and conveniently engaged and disengaged from a horizontal position.

Another object of the invention lies in the provision of improved tilting level construction in which improved means is provided for the convenient adjustment of the telescope tube with respect to the vertical axis of the instrument.

A further object of the invention lies in the provision of improved tripod supporting means which may be conveniently attached to or detached from the base of the instrument, to permit the instrument to be used in conjunction with the support means or other support in selective fashion.

Another object of the invention lies in the provision of improved telescope construction of focusing type, including means for accommodating wear between moving parts of the focusing means.

Still another object of the invention lies in the provision of a sturdy and dependable tilting level surveying instrument, in which the cost of fabrication may be of a reasonably low order, thereby permitting consequent wide sale, distribution and use.

A feature of the invention lies in the increased facility with which the device may be handled by those possessing relatively little or no experience in surveying.

These objects and features, as well as other incidental ends and advantages, will become more clearly apparent during the course of the following disclosure, and will be pointed out in the appended claims.

On the drawings, to which reference will be made in the specification, similar reference characters have been employed to designate corresponding parts throughout the several views.

Figure 1 is a vertical longitudinal sectional view, partly in elevation, of an embodiment of the invention.

Figure 2 is a fragmentary transverse sectional view, partly in elevation.

Figure 3 is a fragmentary plan view of the embodiment.

Figure 4 is an enlarged vertical sectional view corresponding to the upper portion of Figure 2.

Figure 5 is a view in perspective showing one of the component parts of the telescope focusing means which comprises a part of the embodiment.

Figure 6 is a fragmentary view in perspective corresponding to the central portion of Figure 1.

Figure 7 is a fragmentary view in elevation showing a focusing tube which comprises a part of the focusing means of the telescope.

Figure 8 is an exploded view of the component parts comprising the telescope supporting means.

Figure 9:
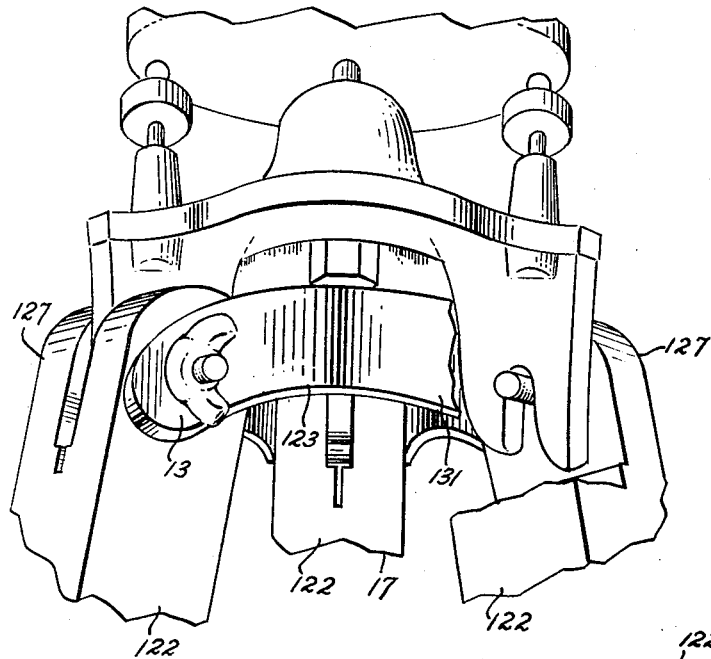
Figure 9 is a fragmentary view in perspective showing a tripod support element which comprises a part of the device.

In accordance with the invention, the device, generally indicated by reference character 10, comprises broadly: a trivet element 11, a horizontal circle element 12, telescope means 13, telescope supporting means 14, telescope locking means 15, telescope focusing means 16, and a supporting tripod element 17.

The trivet element 11 is preferably of cast aluminum construction, in the interests of lighter weight, and includes a plate member 20, a plurality of substantially vertically disposed flange members 21 extending from the lower surface of the plate member 20. Leveling means 22 of well known type are adapted to extend into portions of the flange members 21. The centrally disposed hollow projection 23 is provided with an opening 24, a curved pivot member 25 having a bore 26 being positioned within the hollow of the projection 23. An elongated hollow support member 27 is engaged within the bore 26, the lower end 28 of which is provided with plumb bob supporting means 29. A spring 30 is disposed coaxially with the support member 28, the lower end 31 of which engages an enlarged portion 32 thereon, while an upper end 33 is adapted to contact the under surface 34 of the pivot member 25. The upper end 35 of the support member 27 is threadedly engaged with the horizontal circle element, and from a consideration of Figure 1, it will be apparent that the spring 30 resiliently urges the horizontal circle element 12 upon the upper portions of the leveling means 22. A pair of guides one of which is indicated by reference character 36 engages the knob 37 of one of the screw members 38 to prevent axial rotation of the horizontal circle element with respect to the trivet element.

The horizontal circle element 12 is also preferably of cast aluminum construction, and includes a base member 40, the lower surface 41 of which rests upon the leveling means 22. A vertically disposed annular flange member 42 extends upwardly from the base member 40, the former having a horizontally disposed annular flange 43 extending radially therefrom to provide means for supporting a scale 44 rotatably associated therewith. A movable member 45 is provided with a scale pointer 45a (see Fig. 3) and an annular flange 46 which rides within the flange member 42 on the base member 40. The movable member 45 is mounted on a central spindle 47 threadedly engaged with the support member 27, the spindle serving as a bearing. Resiliently engageable gear adjusting means 48 permits fine adjustment of the position of the movable member 45 with respect to the scale 44, the same being engageable with a gear 49 on the base member 40 by manually overcoming the action of a spring 50 to engage a pinion 50' therewith.

The telescope means 13 includes an optical tube 51, in which are positioned an objective lens 52, an image erecting lens 53 and an eyepiece lens 54. The objective lens is preferably mounted within a lens barrel 55 while the image erecting lens 53, eyepiece lens 54 and cross hair supporting member 57 are all disposed within a focusing tube 56. Bubble tube means 58 is mounted on the upper portion of the optical tube 51, and is provided with adjusting screws 59 of well known type. Extending downwardly from the tube 51 is a centrally disposed mounting member 60 having a horizontally disposed bore 61 therein and an elongated tongue 62 extending downwardly from said bore. A locking pin 63 is disposed at right angles with respect to said tongue at the lowermost end thereof.

The telescope supporting means 14 includes a pair of trunnion members 65 and 66, provided with axially aligned bores 67. One of the bores 67 is engaged by a threaded bushing 68 (see Fig. 8) the bushing having a threaded portion 69 leading to a cup-shaped recess 70. A similar bushing 71 having an unthreaded bore 72 leading to a cup-shaped recess 73 is supported by the other of the bores 67, so that a threaded headed screw member 74 may engage a bore 75 in a supporting spindle 76 which is supported by the cup-shaped recesses 70 and 73. A threaded bore 77 in the mounting member 60 is provided with a set screw 78, and similar bores 79 and 81 are provided with set screws 80 and 82, respectively in the trunnion members 65 and 66. The position of the optical tube 51 is obtained by first anchoring the bushing 71 in either of the trunnion members 65 and 66 by the appropriate set screw, and tightening the screw member 78 within the bushing 68 to achieve the desired tension upon the spindle 76. Tube 51 is then centered over the vertical axis of the instrument, at which time the set screw 78 is tightened to prevent axial or rotational shifting of the mounting member 60 with respect to the spindle.

The telescope locking means 15 is of a resilient type which may be easily released under manual pressure. An integrally formed mounting portion 86 on the movable member 45 supports a latch member 87 by means of screws 88 which engage elongated slots (not shown) in the latch member. The latch member 87 includes a fixed portion 89, a resilient portion 90, a finger engaging portion 91 and pin engaging portions 92 and 93 each of which is provided with a notch 94 which cams the optical tube 51 to horizontal position when proper adjustment of the fixed portion 89 is obtained. To release the telescope tube, it is necessary only to push downwardly on the finger engaging portion 91 to the point where the notches 94 clear the pin 63, following which the telescope is rotated about its horizontal axis of rotation to clear the pin engaging portions 92 and 93. Upon release of the finger engaging portion 91, the pin engaging portions will move to their lowermost position, allowing free traverse of the tube.

The telescope focusing means 16 is actuated by a knob 101 mounted upon a shaft 102. A pinion 103 engages a rack 104 on one edge of an elongated slot 105 in the focusing tube 56. The shaft 102 terminates in a conically-shaped member 106 which is adapted to bear against the upper edge 107 of the slot 105. A resilient member 108 urges the shaft 102 in such a manner that the conically-shaped portion 106 constantly presses against the edge 107, the member 108 including a mounting tab portion 109 secured by screw means 110 to an extended projection 111 on the tube 51, and a resilient portion 112 having a notch 113 which engages a reduced portion 114 of the shaft 102 to bear upon a shoulder portion 115. Since the axis of the shaft 102 is askew with respect to the principal axis of the focusing tube 56, the resilient pressure of the member 108 tends to cause the focusing tube to rotate about its own axis wherein the rack 104 is pressed firmly against the pinion 103. As wear occurs between the rack and the pinion, the resilient pressure exerted by the cone 106 on the edge 107 causes the rack to move further into engagement with the pinion, thereby taking up the slack created by wear as fast as the same develops. As may be seen on Figures 4 and 5, the edge 107 rests partially upon the cone-shaped portion 106, and partially against the side edges of the pinion teeth, to become resiliently wedged therebetween.

Figure 10:
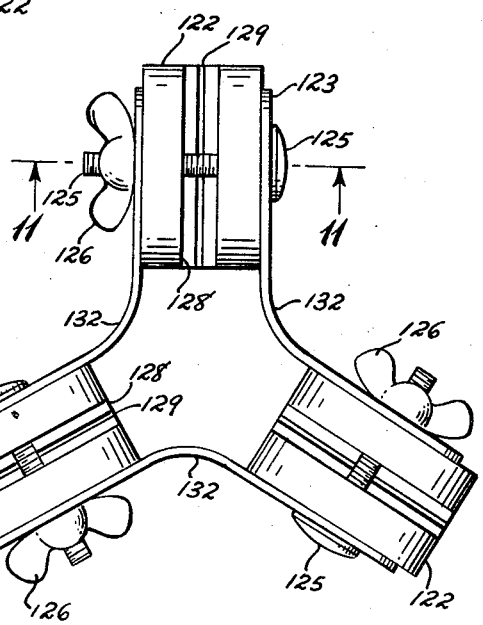
Figure 10 is a plan view of the tripod element in folded condition.
Figure 11:
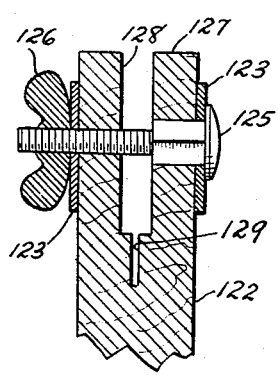
Figure 11 is a vertical fragmentary sectional view as seen from the plane 11—11 on Figure 10.

The tripod element 17 is best seen on Figures 9, 10 and 11 of the drawings, and includes a plurality of legs 122, a like number of angularly-shaped connecting brackets 123, a plurality of bolts 125 and corresponding wing nuts 126. Referring to Figure 11, the upper terminal 127 on each leg 122 is provided with a slot 128 corresponding to the width of the flange members 21 and a relatively narrower slot 129 to allow a limited degree of flexure. Referring to Figure 9, it will be observed that slot 130 in each of the flange members 21 is positioned so as to be engaged by a bolt 125 when the device is completely assembled. Each of the brackets 123 is generally similar, including a pair of planar portions 131 interconnected by a bend portion 132.

The tripod element 17 is assembled as best seen on Figure 10, wherein the brackets 123 form a means for pivotally joining the legs 122 when the tripod element is detached from the trivet element. To mount the trivet element upon the tripod element it is necessary only to loosen the wing nuts 126, and engage the slots 130 in the flange members 21 with the bolts 125. The tightening of the wing nuts restores necessary tension to the joint and creates sufficient static friction between the legs 122, brackets 124 and flange members 21 so that the legs will remain in any position in which they are adjusted.

When removing the tripod element from the trivet element it is not necessary to separate the individual legs, as the brackets 123 continue to maintain the necessary mutual relationship between the legs to permit the trivet element to be again readily engaged.

It may thus be seen that we have invented novel and highly useful improvements in surveying instrument construction which permit the manufacture of a sturdy, durable and reliable instrument at reasonably low cost. Handling of the device is facilitated by provision of an integral tripod support means which is readily separable from the remaining parts of the instrument without complete disassembly. By the provision of novel telescope locking means, it is possible to unlatch the telescope tube for traverse about a horizontal axis with a minimum of manipulation on the part of the user. Predetermined tension governing the automatic fixing of a given horizontal adjustment of the telescope tube is accomplished by means of a simple supporting spindle positioned between a pair of bushings. By means of a novel focusing tube adjustment, wear normally occurring between rack and pinion, is constantly adjusted, thereby preserving the useful life of the instrument.

We wish it to be understood that we do not consider the invention limited to the precise details of structure shown and set forth in this specification, for obvious modifications will occur to those skilled in the art to which the present invention pertains.

We claim:

1. In a surveying instrument construction, including a telescope tube and means for supporting said telescope tube for rotation about a horizontal axis, the improvement comprising: said supporting means including a pair of substantially vertically disposed trunnion members interconnected by a horizontally disposed spindle upon which said telescope tube is mounted; said tube having an elongated tongue, said tongue having a principal axis which is disposed substantially perpendicular to the axis of said tube and extending substantially downward therefrom between said trunnion members; a locking pin disposed upon said tongue at substantially a right angle with respect to said principal axis, and resilient locking means engageable with said pin when said tube is in predetermined position; said resilient locking means in relaxed condition, positioning itself out of the path of travel of said pin; said locking means including a latch member having a first fixed mounting portion, a resilient portion formed integrally therewith and a pin engaging portion interconnected with said resilient portion, said pin engaging portion having a notch therein which upon selective engagement with said locking pin cams said telescope to said predetermined position.

2. In a surveying instrument construction, including a telescope tube and means for supporting said telescope tube for rotation about a horizontal axis, the improvement comprising: said supporting means including a pair of substantially vertically disposed trunnion members interconnected by a horizontally disposed spindle upon which said telescope tube is mounted; said tube having an elongated tongue, said tongue having a principal axis which is disposed substantially perpendicular to the axis of said tube and extending substantially downward therefrom between said trunnion members; a locking pin disposed upon said tongue at substantially a right angle with respect to said principal axis, and resilient locking means engageable with said pin when said tube is in predetermined position; said resilient locking means in relaxed condition, positioning itself out of the path of travel of said pin; said locking means including a latch member having a first fixed mounting portion, a resilient portion formed integrally therewith and a pair of pin engaging portions, each having a notch therein which upon selective engagement with said locking pin on either side of said tongue cams said telescope to said predetermined position.

References Cited in the file of this patent

UNITED STATES PATENTS

| | | |
|---|---|---|
| 416,270 | Paoli | Dec. 3, 1889 |
| 891,952 | Reynolds | June 30, 1908 |
| 1,003,419 | Berger | Sept. 19, 1911 |
| 2,674,044 | Baker | Apr. 6, 1954 |